United States Patent
Desanti

(10) Patent No.: US 7,367,052 B1
(45) Date of Patent: Apr. 29, 2008

(54) ACCESS LIST KEY COMPRESSION

(75) Inventor: Claudio Desanti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 10/313,751

(22) Filed: Dec. 4, 2002

(51) Int. Cl.
*G06F 15/173* (2006.01)
*G06F 17/30* (2006.01)
*G06F 15/16* (2006.01)

(52) U.S. Cl. .................. 726/3; 709/229; 709/243; 713/154

(58) Field of Classification Search ............... 726/3
See application file for complete search history.

(56) References Cited

U.S. PATENT DOCUMENTS

| | | | | |
|---|---|---|---|---|
| 5,197,002 A | * | 3/1993 | Spencer | .................. 705/34 |
| 5,303,344 A | * | 4/1994 | Yokoyama et al. | ......... 709/230 |
| 5,509,123 A | * | 4/1996 | Dobbins et al. | ............ 709/243 |
| 5,617,421 A | | 4/1997 | Chin et al. | |
| 5,740,171 A | | 4/1998 | Mazzola et al. | |
| 5,742,604 A | | 4/1998 | Edsall et al. | |
| 5,764,636 A | | 6/1998 | Edsall | |
| 5,809,285 A | | 9/1998 | Hilland | |
| 5,958,053 A | * | 9/1999 | Denker | ............... 726/1 |
| 5,999,930 A | | 12/1999 | Wolff | |
| 6,018,526 A | * | 1/2000 | Liu et al. | .................. 370/401 |
| 6,035,105 A | | 3/2000 | McCloghrie et al. | |
| 6,055,236 A | * | 4/2000 | Nessett et al. | .............. 370/389 |
| 6,101,497 A | | 8/2000 | Ofek | |

(Continued)

FOREIGN PATENT DOCUMENTS

JP     2000 242 464 A     9/2000

(Continued)

OTHER PUBLICATIONS

Handley et al., RFC 2776, "Multicast-Scope Zone Announcement Protocol (MZAP)," 2000.*

(Continued)

*Primary Examiner*—Matthew Heneghan
(74) *Attorney, Agent, or Firm*—Weaver Austin Villeneuve & Sampson LLP

(57) ABSTRACT

Methods and apparatus for implementing an access list key for accessing information associated with a packet from an access list are disclosed. The packet includes an IP source address field and an IP destination address field, the IP source address field including an IP source address and the IP destination address field including an IP destination address, the IP source address and the IP destination address each having a number of bits (e.g., 128 bits in the case of IPv6). An IP source address is obtained from the IP source address field of the packet and an IP destination address is obtained from the IP destination address field of the packet. A modified IP source address is generated from the obtained IP source address such that the number of bits in the modified IP source address is less than the number of bits in the obtained IP source address. In addition, a modified IP destination address is generated from the obtained IP destination address such that the number of bits in the modified IP destination address is less than the number of bits in the obtained IP destination address. The access list key is then composed from the modified IP source address and the modified IP destination address.

41 Claims, 21 Drawing Sheets

U.S. PATENT DOCUMENTS

| | | |
|---|---|---|
| 6,104,720 A * | 8/2000 | Kisor .................. 370/431 |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,516,383 B1 * | 2/2003 | Patra et al. ............ 711/108 |
| 6,542,961 B1 | 4/2003 | Matsunami et al. |
| 2003/0126233 A1 * | 7/2003 | Bryers et al. ............ 709/219 |

FOREIGN PATENT DOCUMENTS

WO     WO 01/80013 A1    10/2001

OTHER PUBLICATIONS

Deering et al., RFC 2460, "Internet Protocol, Version 6 (IPv6) Specification," 1998.*

PCT *International Search Report*, Application No. PCT/US 2003/00883, Int'l filing date Jan. 10, 2003, mailed Mar. 11, 2005.

S. Deering and R. Hinden, "*Internet Protocol, Version 6 (IPv6) Specification*," RFC 2460, Dec. 1998, 28 pp.

R. Hinden and S. Deering, "*IP Version 6 Addressing Architecture*," RFC 2373, Jul. 1998, 19 pp.

* cited by examiner

Example of Access Control List 200

| IP_SA 202 | IP_DA 204 | Protocol type 206 | S_Port 210 | D_Port 212 | Permit / Deny 208 |
|---|---|---|---|---|---|
| * | IP address of Mail Server | TCP | * | 25 | Permit |
| IP address of Mail Server | * | TCP | 25 | * | Permit |
| * | * | * | * | * | Deny |

*FIG. 2 (PRIOR ART)*

Fast path scan algorithm

```
while (not (end of packet))
if (next_header is one of (Routing Header, Authentication, Destination,
    Fragment with null offset)) {continue;}
else {
if (next_header == TCP/UDP/SCTP)
    {ACL_key = IPv6 TCP/UDP/SCTP key;}
else if (next_header == ESP) {ACL_key = IPv6 ESP key;}
else if (next_header == ICMP) {ACL_key = IPv6 ICMP key;}
else if (terminating next header found) {ACL_key = default IPv6 key;}
else {punt the packet to slow path;}
break;}
```

*FIG. 6*

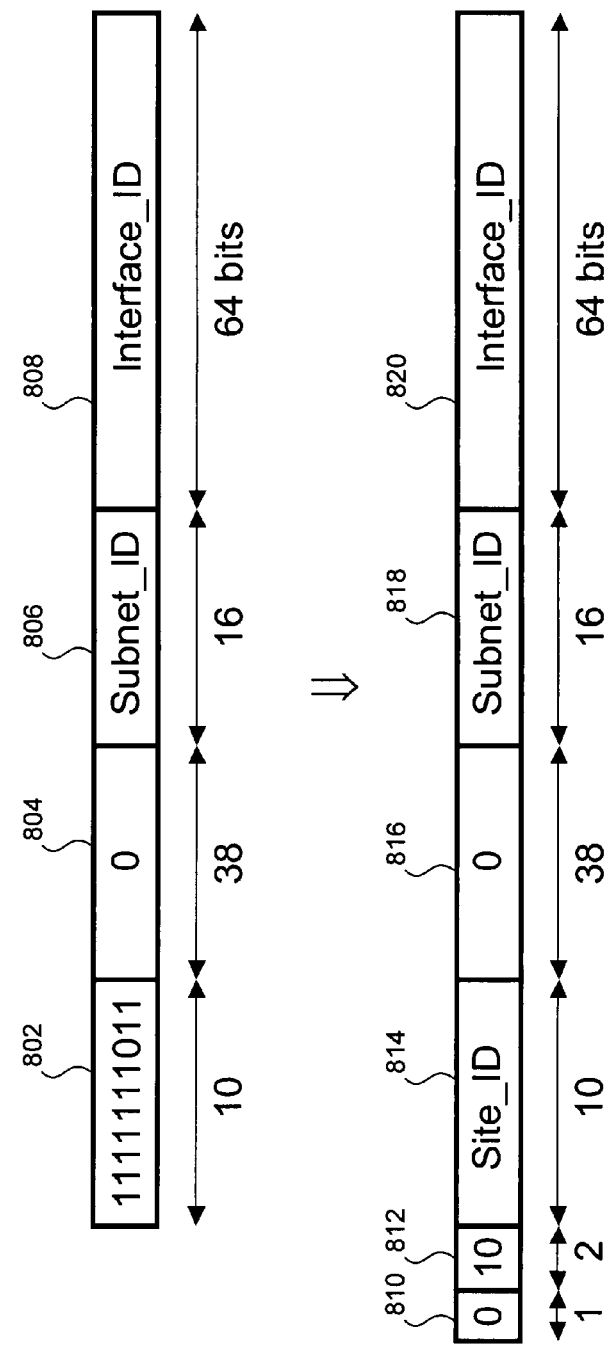

TCP/UDP/SCTP/ESP Key

- 1 bit: QoS or Policy ACL
- 130 bits: Compressed Unicast Source Address
  - Including the source port (or half SPI)
- 1 bit: TCP SYN flag
- 130 bits: Compressed Unicast Destination Address
  - Including the destination port (or the other half SPI)
- 8 bits: final Next_Header (Protocol)
- 8 bits: L4operation/DSCP
- *Total: 278 bits*
  - 10 bits left for TCAM management and other information

*FIG. 11*

ICMP Key

- 1 bit: QoS or Policy ACL
- 130 bits: Compacted Unicast Source Address
- 131 bits: Compacted Destination Address
- 8 bits: final Next_Header (Protocol)
- 8 bits: ICMP type/DSCP
- *Total: 278 bits*
  - 10 bits left for TCAM management and other information

*FIG. 12*

Default Key

- 1 bit: QoS or Policy ACL
- 130 bits: Compacted Unicast Source Address
- 131 bits: Compacted Destination Address
- 8 bits: final Next_Header (Protocol)
- 8 bits: Reserved/DSCP
- *Total: 278 bits*
- 10 bits left for TCAM management and other information

*FIG. 13*

Compacted unicast addresses

- Put the Scope_ID in place of the Site Local prefix (10 bits).
- Add 1 bit to distinguish between multicast and unicast.
- Add 1 bit to distinguish between Site Local and global addresses.

TCP/UDP/SCTP/ESP Key

- 1 bit: QoS or Policy ACL
- 129 bits: Compressed Unicast Source Address
  - Including the source port (or half SPI)
- 1 bit: TCP SYN flag
- 129 bits: Compressed Unicast Destination Address
  - Including the destination port (or the other half SPI)
- 8 bits: final Next_Header (Protocol)
- 8 bits: L4operation/DSCP
- *Total: 276 bits*
  - 12 bits left for TCAM management and other information

*FIG. 17*

ICMP Key

- 1 bit: QoS or Policy ACL
- 129 bits: Compacted Unicast Source Address
- 130 bits: Compacted Destination Address
- 8 bits: final Next_Header (Protocol)
- 8 bits: ICMP type/DSCP
- *Total: 276 bits*
  - 12 bits left for TCAM management and other information

*FIG. 18*

Default Key

- 1 bit: QoS or Policy ACL
- 129 bits: Compacted Unicast Source Address
- 130 bits: Compacted Destination Address
- 8 bits: final Next_Header (Protocol)
- 8 bits: Reserved/DSCP
- *Total: 276 bits*
  - 12 bits left for TCAM management and other information

*FIG. 19*

Key selection algorithm if ((Protocol == TCP/UDP/SCTP/ESP) & (IP_DA is unicast))
{select TCP/UDP/SCTP/ESP Key;} else if (Protocol == ICMP) {select ICMP Key;} else if (a Protocol is found) {select default Key;} else {punt the packet to slow path;}

*FIG. 20*

ACCESS LIST KEY COMPRESSION

CROSS REFERENCE TO RELATED APPLICATION

This application is related to application Ser. No. 10/791,676 entitled "Access List Key Compression" listing Claudio Desanti as inventor, filed on Mar. 1, 2004, now pending.

BACKGROUND OF THE INVENTION

1. Field of the Invention

The present invention relates to network technology. More particularly, the present invention relates to methods and apparatus for implementing an access list key in IPv6.

2. Description of the Related Art

Routers typically maintain an access control list in order to perform policy based routing. Each entry in the access control list defines an access rule defining a particular type of traffic and whether that traffic will be permitted or denied. The access rule that applies to a data packet received or transmitted by a router may be ascertained from information in one or more headers of the data packet.

An exemplary data packet is illustrated in FIG. 1. As shown, the data packet 100 typically comprises multiple headers, including an IP header 102, a layer 4 header 104 (e.g., TCP), and an application header 106 (e.g., HTTP). From each of these headers, information may be obtained that enable a router to route the data packet according to various policies.

When a packet is received or transmitted by a router, the information is extracted from one or more of the packet headers and used to check the access control list (ACL). FIG. 2 is a diagram illustrating an exemplary access control list 200. As shown, a typical access control entry includes an IP source field 202, identifying one or more source IP addresses, an IP destination field 204, identifying one or more destination IP addresses, a protocol type field 206, identifying one or more layer 4 protocols, and a permit/deny field 208, indicating whether traffic is permitted or denied if it matches the access rule defined by that entry. In addition, when the layer 4 protocol uses ports to identify applications, such as TCP, UDP, or SCTP, a source port field 210 and destination port field 212 may be specified that defines one or more source and destination ports, respectively. Conceptually, the information extracted from a packet is used to sequentially check each access control entry, and when a match is found, the action specified by that entry (permit or deny) is applied to the packet. For instance, as shown, traffic sent from any IP address to a mail server using the TCP protocol from any source port to the mail port will match the first entry and will be allowed. Traffic sent from the mail server to any IP address using the TCP protocol from the mail port to any port will match the second entry and will be allowed. Any other kind of traffic will match the third entry and will be denied. In this manner, access rules are defined and used for filtering packets.

The classification capabilities of ACLs are used not only for policy reasons, but also to implement traffic prioritization, in order to give to each kind of traffic the appropriate Quality of Service (QoS) that it deserves. The process is the same as that depicted above, but each access control entry is associated with a priority value instead of with a Permit/Deny rule. For this case an additional field is usually added to the access control entry, the Differentiated Service Code Point (DSCP) field present in the IP header.

In IPv4, each source and destination IP address field of an IP data packet comprises 32 bits. However, with the advent of the Internet and the need for connecting many more computers via the Internet, a new version (called IPv6, defined in RFC 2460) of the IP protocol has been defined, in which the length of the source and destination IP address fields of an IP data packet have each been increased four-fold to 128 bits. In addition, IPv6 provides for modular headers. FIG. 3 illustrates an exemplary IPv6 header. As shown, a next header field 302 points to the next header.

FIG. 4 illustrates the use of modular IPv6 "extension" headers. In each example, an IPv6 header is the initial header. In each header, a next header field points to the next header. Thus, a header may be an initial header (e.g., IPv6 header), intermediate header, or terminating (e.g., layer 4) header.

Processing done by a router is often performed in hardware, since the hardware can be faster than the software. As one example, an access control list is sometimes implemented in Ternary Content Addressable Memory (TCAM). An exemplary TCAM is illustrated in FIG. 5. A TCAM 500 comprises a plurality of entries 502. Each entry 502 comprises a key 504 corresponding to an address or pointer 506 to another conventional memory that specifies the manner in which a packet is to be handled. For instance, in this example, the conventional memory is an entry 508 in a policy table 510 that specifies if the packet is to be forwarded or dropped.

An access list key used in a memory such as a TCAM is typically generated using information from the IP header as well as information from additional header(s) (e.g., layer 4 header). As one example, the key may be composed of the source IP address, destination IP address, protocol type, source port, and destination port. Finding the information required to compose a key has become more complicated in IPv6, due to the modularization of headers. Moreover, the size of the key is constrained by the size of the TCAM.

Currently, the maximum size of an entry in a conventional TCAM is 288 bits wide. The maximum size of a TCAM has not previously been a limiting factor using IPv4, but the size of the source IP and destination IP address fields have dramatically increased with IPv6. Thus, with 128 bits for the source and destination IP address fields, 8 bits for the protocol type, and 16 bits for the source port and destination port fields, a key in IPv6 can require 296 bits. Accordingly, a key in IPv6 for an access list is larger than the maximum size of an entry in a TCAM. The problem is even worse if we consider the use of the ACL for QoS reasons, since to add the DSCP field to the key would require adding at least 6 other bits.

Various types of addressing schemes are currently possible to identify source and destination IP addresses in IPv6, according to the IPv6 addressing architecture document, RFC 2373. For instance, multicast as well as unicast addresses are used. Unicast addresses may be classified as one of three types. The first type of unicast address is the global scoped address, which is unique across the entire network. The second type of unicast address is a local scoped address and unique on a single link, typically referred to as a "link local" address. The third type of address is also a local scoped address, but is unique on a single site, and is therefore referred to as a "site local" address. A site is a connected subset of a network. While a global scoped address is globally unique, additional bits are required to identify the zone in which a particular local scoped address applies. This local scoped addressing therefore requires a greater number of bits be used in an access list key.

Various solutions have been proposed in order to implement in hardware an IPv6 access control list. For instance, solutions have been implemented in which a larger key look-up is implemented through two related look-ups using smaller keys. Thus, two or more different table look-ups are performed. As one example, an access list key is first used to access an entry in a TCAM. The entry in the TCAM is then used to look up information in a second TCAM, and finally to a memory or table to determine whether a packet should be forwarded or dropped. However, the use of two different look-ups is inefficient due to the additional processing required, and not all hardware platforms can afford them.

In view of the above, it would be desirable if a key for an access control list could be implemented in IPv6 that would enable a single look-up to be performed.

SUMMARY OF THE INVENTION

Methods and apparatus for composing and implementing an access list key for accessing information from an access list are disclosed. In accordance with various embodiments, an access list key may include addresses such as IPv6 addresses. In addition, circumstances in which an access list key is to be applied and that define when a packet is to be processed in hardware are established to enable a packet to be more efficiently processed.

In accordance with one aspect of the invention, a packet is classified according to its protocol and/or other information such as address types. This information may then be used to determine whether the packet is to be handled by hardware (and therefore whether a hardware access list key is to be composed) or software. In addition, the classification may be used to determine the format of the compressed/compacted address as well as the format of the access list key to be generated. For instance, an address that is a unicast address may be compressed differently than a multicast address. Similarly, an address that is a global-scoped address may be formatted differently than an address that is a link-local or site-local address.

In accordance with another aspect of the invention, an access list key having a reduced number of bits is generated from a received IP packet (e.g., IPv6 packet). The IPv6 packet includes an IPv6 source address field and an IPv6 destination address field, the IPv6 source address field including an IPv6 source address and the IPv6 destination address field including an IPv6 destination address, the IPv6 source address and the IPv6 destination address each having a number of bits (e.g., currently 128 bits). An IPv6 source address is obtained from the IPv6 source address field of the packet and an IPv6 destination address is obtained from the IPv6 destination address field of the packet. A modified IPv6 source address is generated from the obtained IPv6 source address such that the number of bits in the modified IPv6 source address is less than the number of bits in the obtained IPv6 source address. In addition, a modified IPv6 destination address is generated from the obtained IPv6 destination address such that the number of bits in the modified IPv6 destination address is less than the number of bits in the obtained IPv6 destination address. The access list key is then composed from the modified IPv6 source address and the modified IPv6 destination address. Since the access list key has a reduced number of bits, a single look-up is made possible. This method may also be applied to other versions of IP, such as those that will eventually replace IPv6, or to other network protocols.

In accordance with yet another aspect of the invention, bits gained as a result of compaction/compression are used to include further information in the access list key. For instance, a key bit may be used to indicate the type (e.g., policy, or QoS) of the access list key. As another example, additional bits gained may be used to store layer 4 port information. Accordingly, the bits that are gained as a result of compaction and compression may be used for policy as well as quality of service features.

Various network devices may be configured or adapted for intercepting, generating, modifying, and transmitting packets, frames and data structures to implement the disclosed access list key formats and methods. These network devices include, but are not limited to, servers (e.g., hosts), routers, and switches. Moreover, the functionality for the disclosed access list key processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets, and data structures having the format described herein and provided on appropriate media are part of this invention.

These and other features of the present invention will be described in more detail below in the detailed description of the invention and in conjunction with the following figures.

BRIEF DESCRIPTION OF THE DRAWINGS

FIG. 2 is a diagram illustrating an exemplary access control list.

FIG. 6 is a diagram illustrating a method for classifying a packet according to one of a set of types of access list keys in accordance with various embodiments of the invention.

FIG. 8A is a diagram illustrating how to obtain a compacted representation (reduced in size without losing information) of a Site Local unicast address in accordance with one embodiment of the invention.

FIGS. 11 through 13 illustrate three possible access list key formats according to one embodiment of the invention corresponding to the compacted and compressed addresses illustrated in FIGS. 7 through 10.

FIGS. 17 through 19 illustrate three additional possible access list key formats according to another embodiment of the invention corresponding to the compacted and compressed addresses illustrated in FIGS. 14 through 16.

FIG. 20 is a diagram illustrating a key selection algorithm in accordance with various embodiments of the invention.

DETAILED DESCRIPTION OF THE PREFERRED EMBODIMENTS

Figure 1:
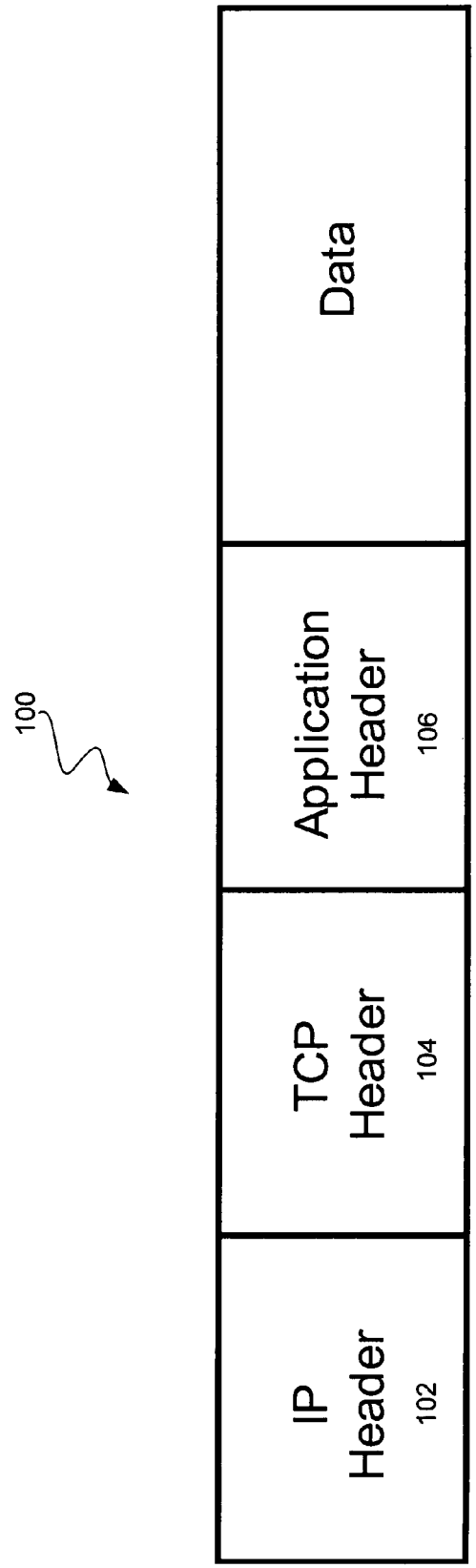
FIG. 1 is a diagram illustrating an exemplary data packet.
Figure 3:
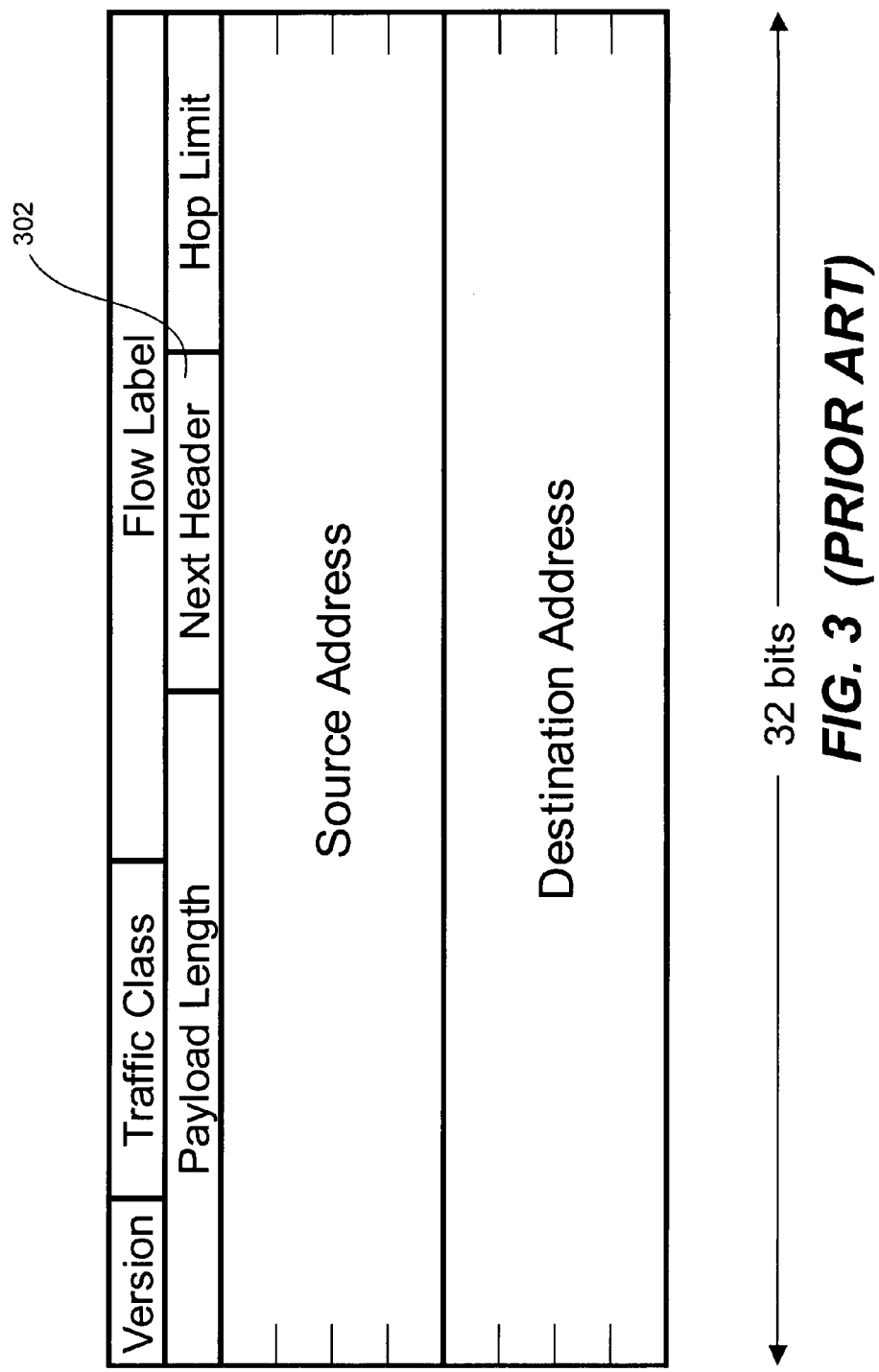
FIG. 3 is a diagram illustrating an exemplary IPv6 header.
Figure 4:
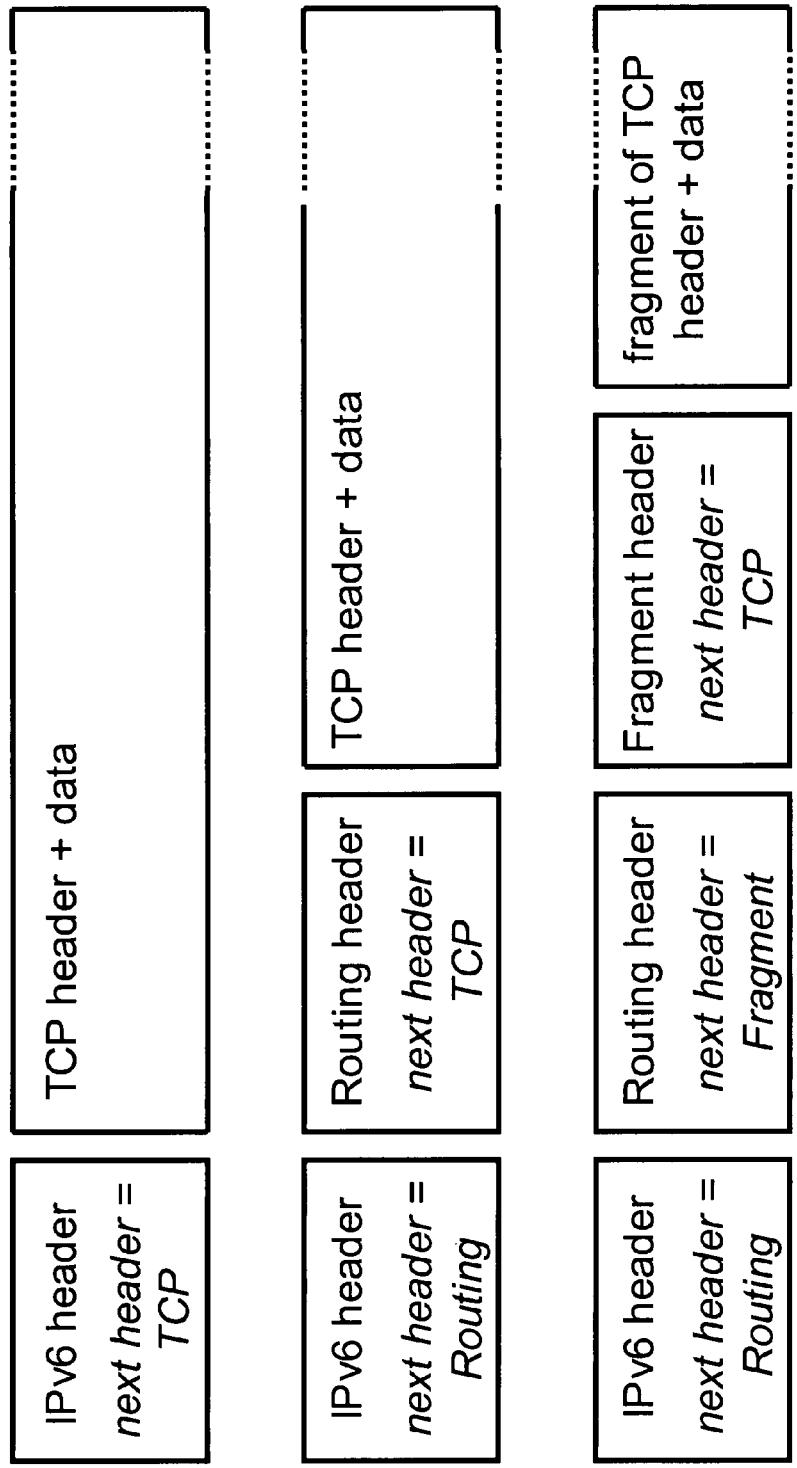
FIG. 4 is a diagram illustrating the use of modular extension headers in an IPv6 packet.
Figure 5:
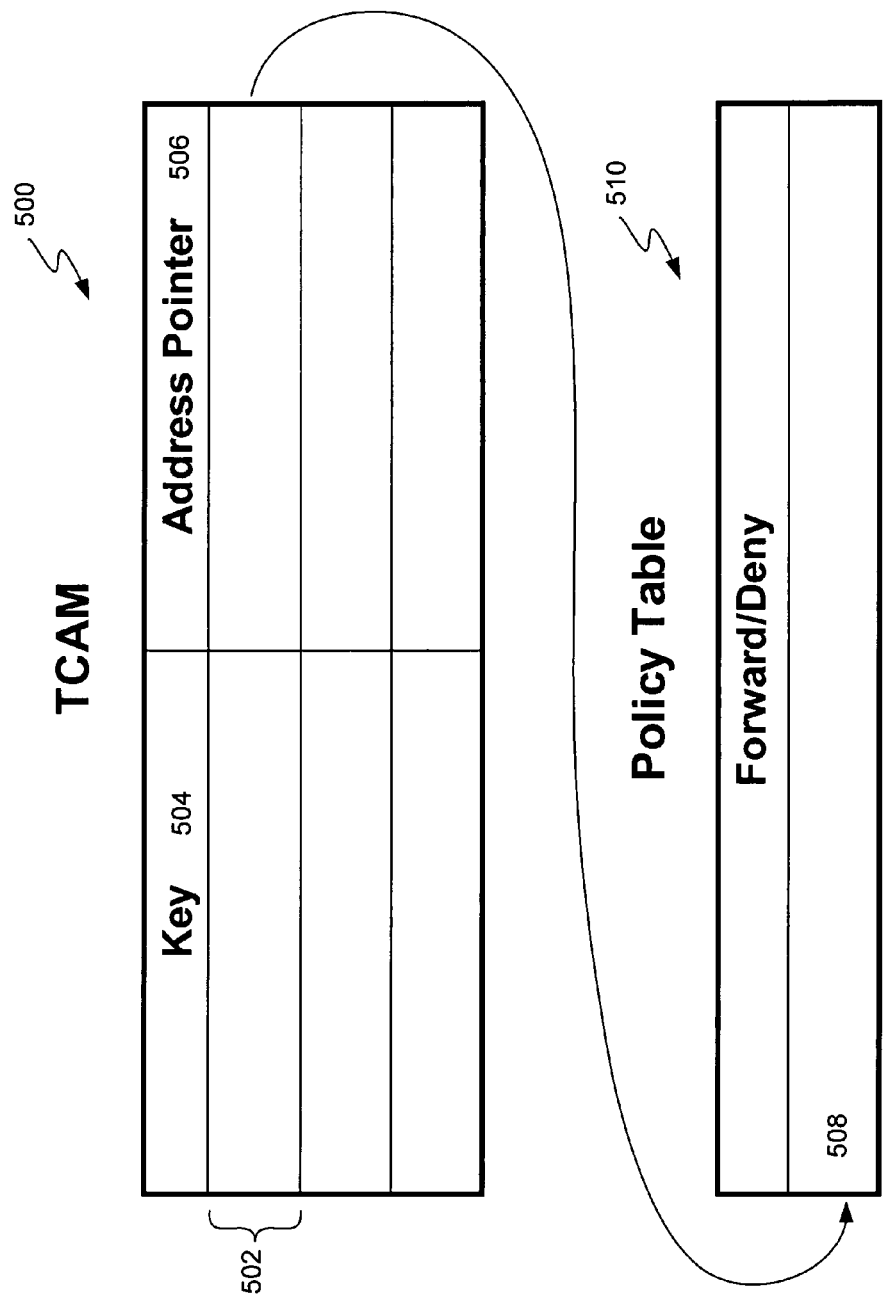
FIG. 5 is a diagram illustrating an exemplary TCAM that may be used to implement the required access control list processing.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with one embodiment, the present invention is implemented in a high performance IPv6 router or IPv6 L3 switch. These kinds of platform typically contain a general purpose processor and a hardware forwarding engine. The processor implements the routing control protocols and the so called "slow path" forwarding, a software version of the forwarding operations. The hardware forwarding engine implements the so called "fast path" forwarding, fast because it is performed by the hardware. In order to be feasible, typically a hardware forwarding engine does not implement the forwarding processing for every possible case, but only for the most common kinds of packets. If a packet requires special treatment it will be passed to the software path, which is slower, but complete and able to handle every case. So, when a packet enters such a platform, the hardware forwarding engine first classifies it in order to determine if it can be handled by the hardware. If yes, the hardware will do the job, otherwise the packet will be punted to the software path.

In order to be effective, this type of two layers architecture requires a clear division of the subset of cases that the hardware forwarding engine has to process. If these are the common cases, then the platform will perform well; if not, then a large amount of traffic will be handled by the software instead of by the hardware, and the performance will be poor. Therefore, it is important to determine which packets are the common packets to be handled by the hardware.

In accordance with one embodiment, this invention assumes that the common IPv6 packets are those not conveying a Hop-by-Hop Option header. From an ACL point of view, another important assumption is that it is not necessary to perform a L4 port check in the fast path ACL when the destination address is multicast. This assumption is based upon the behavior of currently deployed applications: multiple multicast applications on a node use different multicast addresses to distinguish among themselves, not a single multicast address plus a port number. This assumption greatly simplifies the hardware design, without a reduction in accuracy: if a more particular processing is required, it can be performed by the software path.

In order to compose a fast path access list key, the appropriate key format is determined by the forwarding engine. The key format will differ with the protocol as well as the type of addresses. Thus, in accordance with one aspect of the invention, a packet is classified into one of four types of keys in order to extract and format an access list key. The first type of key relates to packets sent in accordance with a layer 4 protocol requiring that source and destination ports be specified. Exemplary layer 4 protocols requiring that source and destination ports be specified include TCP, UDP, and SCTP. Thus, the access list key is composed of the source IPv6 address, destination IPv6 address, layer 4 protocol number, and layer 4 source and destination port(s). As mentioned previously, this type of key will be applied only to packets with unicast destination address. The second type of key relates to packets sent in accordance with a protocol that does not require that source and destination ports be specified. Exemplary protocols that do not require that source and destination ports be specified include ICMP (and IGMP). Thus, the access list key is composed of the source IPv6 address, destination IPv6 address, protocol number, and ICMP type. The third type of key relates to packets sent in accordance with the Encapsulating Security Payload (ESP) protocol. The access list key for the ESP protocol is comprised of the source IPv6 address, destination IPv6 address, protocol number, and SPI (Security Parameter Index). The SPI field typically requires 32 bits. The fourth type of key is a default classification in which the access list key is comprised of an IPv6 source address, IPv6 destination address, and layer 4 protocol number. Thus, in order to classify each packet, the layer 4 header needs to be identified. Given the modular structure of IPv6 extension headers, a scan of an IPv6 packet is required to find the L4 information.

FIG. 6 is a diagram illustrating pseudo-code for classifying a packet according to one of the four "common" types of access list keys. In order to find the IA information, some headers can be skipped during the IPv6 packet scan. As shown, if the next_header is a routing header, authentication header, destination option header, or fragment header the process continues until one of the "terminating" headers is located. Specifically, when the next_header is a TCP, UDP or SCTP header, the first type of access list key is composed. When the next_header is an ICMP header, the second type of access list key is composed. When the next_header is an ESP header, the third type of access list key is composed. If the next_header is another terminating header (every header different from routing header, authentication header, destination option header, or fragment header, and from the previously mentioned terminating headers, TCP, UDP, SCTP, ICMP, ESP), the default access list key is composed. Thus, in accordance with one embodiment, when a packet is classified into one of four types of classifications (e.g., common cases), an access list key is composed and the packet is handled by hardware (e.g., TCAM). A packet that is not classified into one of four types of common cases, or that requires a more granular processing, is handled by the software path.

In other embodiments of the invention, the types of common cases can be more or less than four. As a relevant example, the hardware may handle only two common cases, implementing two kinds of access list keys, one for the TCP, UDP, and SCTP protocols, and the second one for the default case.

In accordance with another aspect of the invention, destination and source IPv6 addresses are compacted, which results in the reduction of the number of bits in the source and destination IPv6 address fields of an access list key. This is performed in accordance with one embodiment for packets classified into one of the above-listed four types of access list keys to be applied in hardware (e.g., via a TCAM). Compaction may include various processes in order to reduce the number of bits in the source and destination IPv6 address fields. Thus, compaction of the source and destination addresses may be used to increase the number of bits that are available for additional fields, such as for encoding a zone_ID needed to handle non global scoped addresses. Specifically, compaction may be performed for multicast and unicast addresses, as will be described in further detail below with reference to FIGS. 7, 8A, 8B, and 9.

Figure 7:
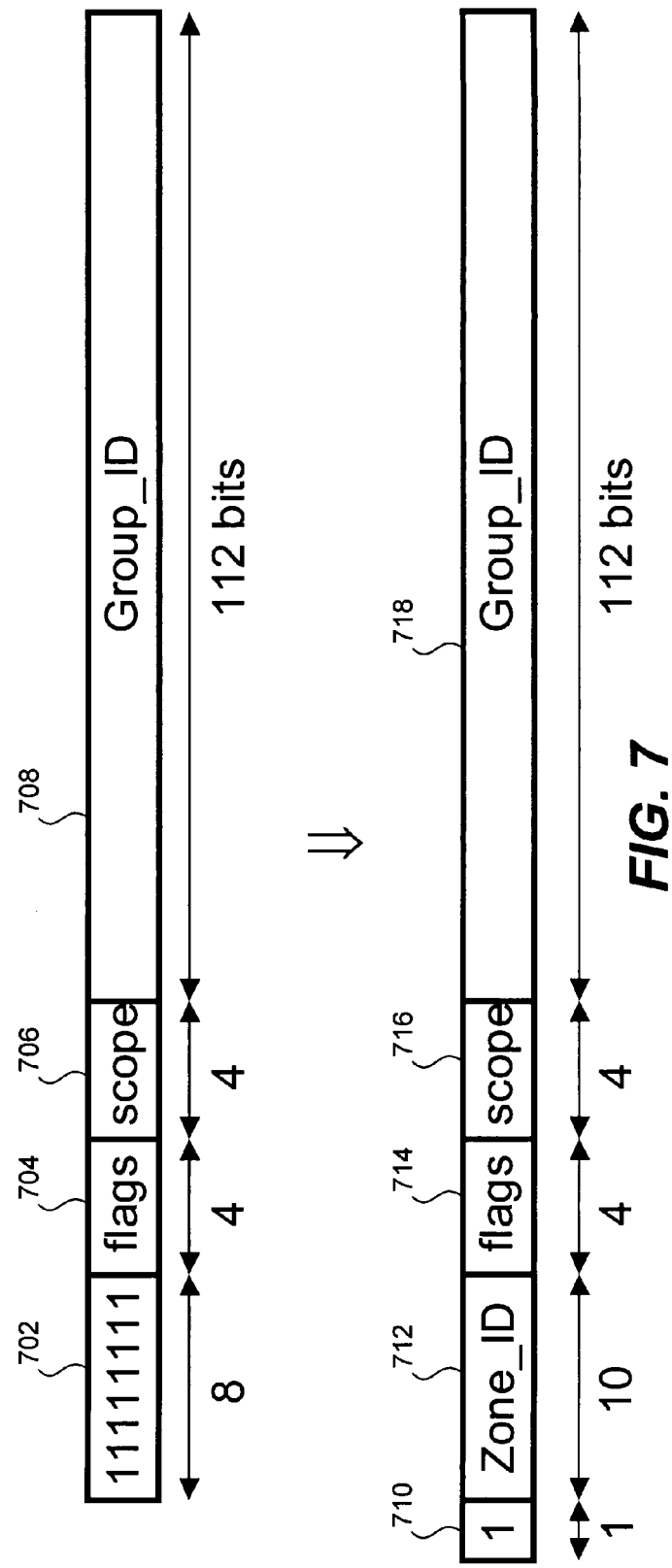
FIG. 7 is a diagram illustrating how to obtain a compacted representation (reduced in size without losing information) of an IPv6 multicast address in accordance with one embodiment of the invention.

FIG. 7 is a diagram illustrating the representation of a compacted multicast address in accordance with various embodiments of the invention. As shown, the zone_ID is substituted for the multicast prefix, which is 8 bits. The zone_ID identifies the zone associated with the interface from which the IPv6 packet has been received, wherein the scope of the zone is expressed by the scope field of the multicast address. A zero value may be used when the address is a global multicast address. In addition, a single multicast/unicast bit is added to distinguish between multicast and unicast addresses.

FIG. 8A is a diagram illustrating the representation of a compacted Site Local unicast address in accordance with various embodiments of the invention. As shown, the Site Local prefix (10 bits) is replaced by the Site_ID associated with the interface from which the IPv6 packet has been received. As described above, a single multicast/unicast bit is added to distinguish between multicast and unicast addresses. In addition, 2 bits are added to identify the Site Local addresses.

Figure 8B:
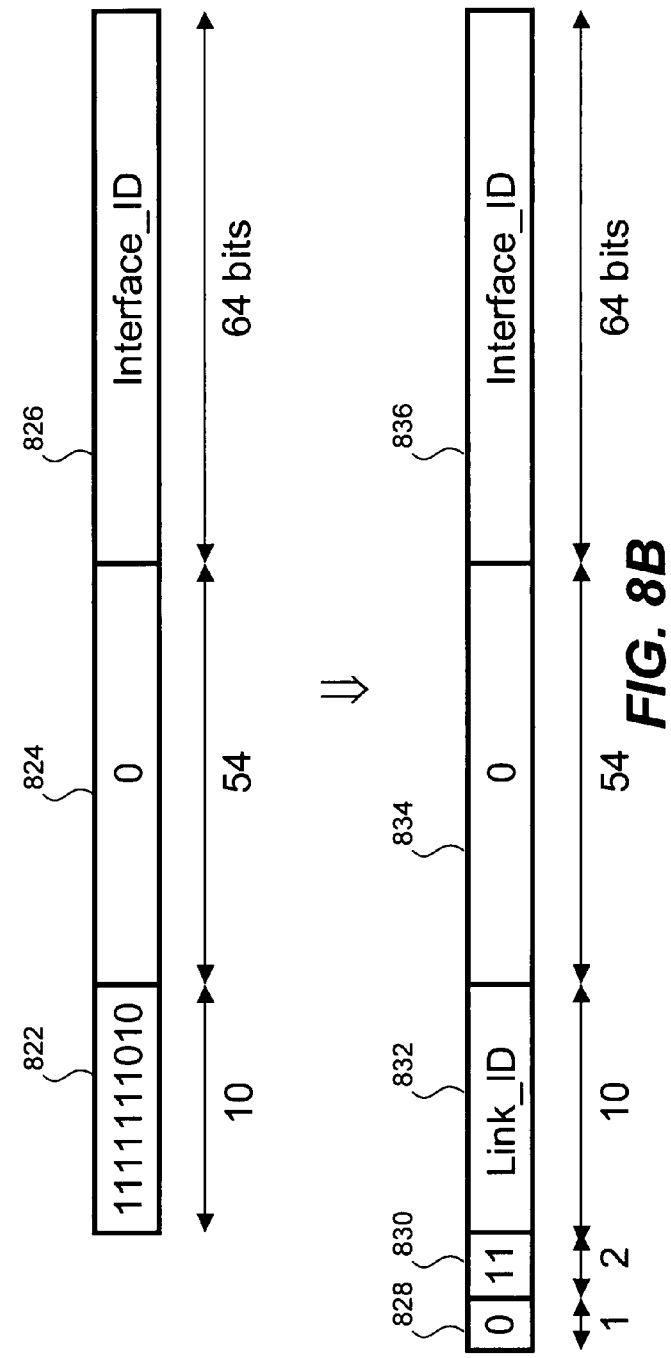
FIG. 8B is a diagram illustrating how to obtain a compacted representation (reduced in size without losing information) of a Link Local unicast address in accordance with one embodiment of the invention.

FIG. 8B is a diagram illustrating the representation of a compacted Link Local unicast address in accordance with various embodiments of the invention. As shown, the Link Local prefix (10 bits) is replaced by the Link_ID associated with the interface from which the IPv6 packet has been received. As described above, a single multicast/unicast bit is added to distinguish between multicast and unicast addresses. In addition, 2 bits are added to identify the Link Local addresses.

Figure 9:
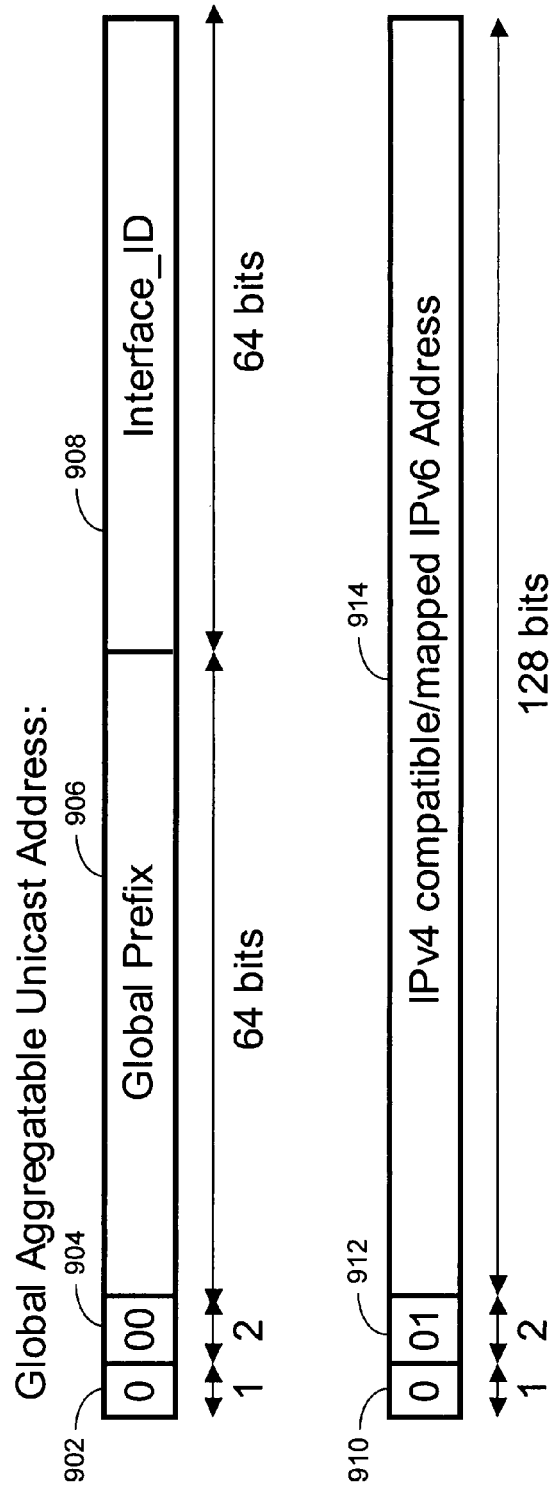
FIG. 9 is a diagram illustrating how to obtain a compacted representation (reduced in size without losing information) of the Global Aggregatable IPv6 addresses, the IPv4 compatible IPv6 addresses and the IPv4 mapped IPv6 addresses, in accordance with one embodiment of the invention.

FIG. 9 is a diagram illustrating the representation of the global unicast addresses in accordance with various embodiments of the invention. As shown, two kinds of global unicast addresses are represented, Global Aggregatable IPv6 addresses and IPv4 compatible/mapped IPv6 addresses. As described above, a single multicast/unicast bit is added to distinguish between multicast and unicast addresses. In addition, 2 bits are added to distinguish between the two considered kinds of address.

As described above with reference to FIGS. 7, 8A, 8B, and 9, a multicast/unicast bit may be used to distinguish between multicast and unicast addresses. However, there are several instances in which the multicast/unicast bit will not be included in the modified (e.g., compacted) address and therefore will not be used to compose the access list key. First, the multicast/unicast bit is not required for the source address field of the access list key. More specifically, as required by the forwarding rules of the IPv6 protocol, the source address must be a unicast address or the packet will be discarded. Thus, in accordance with one embodiment, the multicast/unicast bit is only used for the destination address field of the access list key. Second, on the basis of the assumptions discussed before, an access list will include the layer 4 port information only when the destination address is a unicast address. So, the multicast/unicast bit is not required for the destination address field of the access key when the key is of type TCP/UDP/SCTP.

As described above, IPv6 addresses may be compacted through the removal of one or more bits without removing necessary information from the IPv6 addresses. In addition to compacting the destination and source IPv6 address fields of the access list key, the destination and source IPv6 addresses may be also compressed. In other words, information is removed and therefore compression is a lossy process. For instance, compression may be performed by removing bits from the source and destination address as described below with reference to FIG. 10. As we will see, compression is needed to accommodate in the same bit space occupied by an IPv6 address both the address and the L4 port information when the L4 ports are checked in the ACL processing.

In accordance with one embodiment, compression is performed by removing the first 16 bits (or another group of 16 bits) from an IPv6 address that is IPv4 compatible or IPv4 mapped. Both these kinds of address formats have the first 80 bits set to 0. So, the first 16 bits (or other 16 bits of these 80 bits) of the 128 bits of the IPv6 address can be removed without the loss of necessary information.

In accordance with another embodiment, for IPv6 addresses that are not IPv4 compatible or IPv4 mapped, compression may be performed by removing selected bits from the Interface_ID portion of the unicast address. Specifically, the Interface_ID portion of the unicast addresses is reduced from 64 bits to 48 bits. Specifically, the middle 16 bits of the Interface_ID are removed. This is acceptable, considering how the Interface_ID is configured. IPv6 allows for both manual and automatic configuration of the Interface_ID. There are two main methods specified to configure an Interface_ID: derive it from a MAC address, or derive it randomly.

The first method is used when a stable Interface_ID is desired (e.g., to identify servers). In such a case, the MAC address being 48 bits long, the central 16 bits of the resulting Interface_ID have a fixed pattern, and so by removing them we do not lose any relevant information. And, as shown in FIG. 2, these are the kinds of addresses most often used in ACLs.

The second method is used by clients for privacy reasons. In this case the purpose is to have an Interface_ID capable of changing, possibly very often, in order to avoid being tracked by a third party while accessing the network. Potentially each TCP connection initiated by a client toward a server could have a different Interface_ID. Compressing the Interface_ID in this case implies that an access control key is not capable of matching a specific client. However, given that this kind of Interface_ID may change frequently, it would be very difficult to track a client in any case. So, even in this case the compression of the Interface_ID is acceptable.

Figure 10:
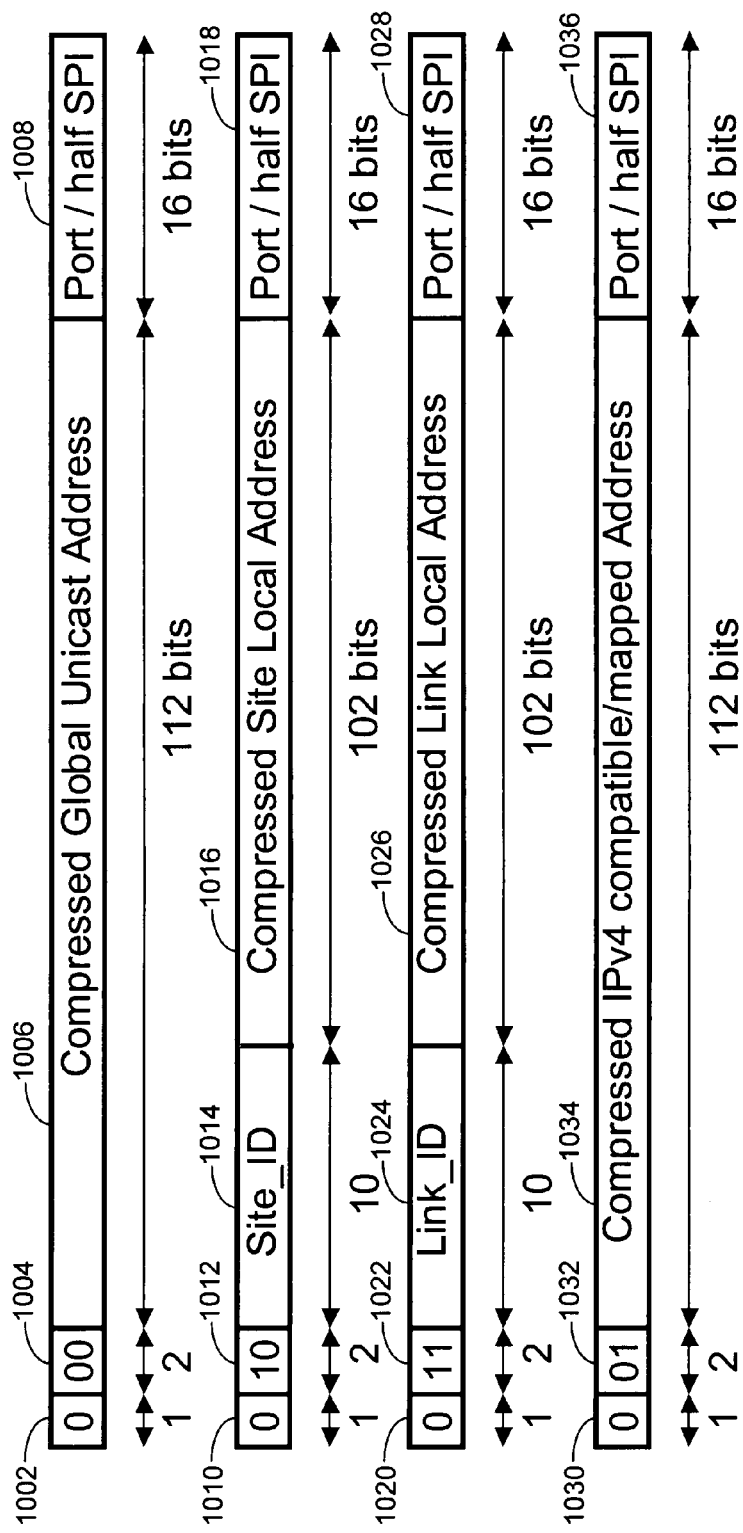
FIG. 10 is a diagram illustrating how to obtain a compressed representation (reduced in size by losing some information) of various kinds of IPv6 unicast addresses in accordance with one embodiment of the invention.

As shown in FIG. 10, the 16 bits that are gained during compression may be used to encode the port number or half of an SPI. Since half of the SPI may be encoded in the 16 bits gained for the source address as well as the destination address, an entire SPI may be encoded. Thus, compression is preferably performed for both source and destination address fields when an SPI is to be encoded. Specifically, if the final Next_Header field indicates that the header is TCP/UDP/SCTP or ESP, then the compressed encoding is performed for both the source address and destination address fields. This enables port information to be encoded for layer 4 protocols requiring ports (e.g., TCP, UDP, or SCTP) or a SPI to be encoded for the ESP protocol. Otherwise, compacted encoding as described above is performed.

Once the source and destination IPv6 address fields have been compacted and/or compressed as described above, the associated access list key is composed. In accordance with one embodiment, two different types of access list keys are possible. Specifically, a policy access list key corresponds to a policy access list. In other words, the policy access list includes a plurality of entries, each of which corresponds to a rule that filters packets. Therefore, a packet will either be forwarded or dropped. A QoS (Quality of Service) access list key corresponds to a quality of service access list. In other words, the quality of service access list prioritizes packets according to a quality of service. This is typically accomplished by determining in which one of a plurality of queues the packet is to be placed. Thus, a key bit is used to distinguish between these two types of keys.

Upon completion of compaction and/or compression as described above with reference to FIGS. 7 through 10, the format of the four types of keys are described below with reference to FIGS. 11 through 13. The format of the first and third keys are illustrated in FIG. 11, the format of the second key is illustrated in FIG. 12, and the format of the fourth key is illustrated in FIG. 13.

As shown in FIG. 11, when the packet is a TCP/UDP, SCTP, or ESP packet, the access list key includes 278 bits, leaving 10 bits for TCAM management and other information. Specifically, as shown, the access list key includes a key bit, 130 bits for the compressed unicast source address (including the source port (or half SPI)), 1 bit for a TCP SYN flag, 130 bits for the compressed unicast destination address (including the destination port (or half SPI)), 8 bits for the final Next_Header which designates the protocol, and 8 bits to encode a specific range of L4 ports, in the case of a policy key, or to encode the QoS DSCP, in the case of a QoS key.

FIG. 12 illustrates the format of the access list key when the packet is an ICMP packet. As shown, the access list key includes 278 bits, leaving 10 bits for TCAM management and other information. Specifically, as shown, the access list key includes a key bit, 130 bits for the compacted unicast source address, 131 bits for the compacted destination address, 8 bits for the final Next_Header which designates the protocol, and 8 bits to encode the ICMP type, in the case of a policy key, or to encode the QoS DSCP, in the case of a QoS key.

FIG. 13 illustrates the format of the access list key for the default case. The access list key includes 278 bits, leaving 10 bits for TCAM management and other information. As shown, the access list key includes a key bit, 130 bits for the compacted unicast source address, 131 bits for the compacted destination address, 8 bits for the final Next_Header which designates the protocol, and 8 bits reserved, in the case of a policy key, or to encode the QoS DSCP, in the case of a QoS key.

It is also possible to further reduce the number of bits in the source and destination addresses. For instance, rather than having the zone_ID include 10 bits, the zone_ID may include 8 or 9 bits. In additional, various optimizations are possible which would enable packets to be more quickly handled. Specifically, certain cases will not be common and therefore they are preferably handled in software. For instance, packets having link-local destination addresses are typically not required to be forwarded, since they are typically sent for control purposes. As a result, a packet including a link local destination address may be handled by software. Thus, packets having destination addresses with scope >=site-local (e.g., site-local or global) are forwarded by hardware, while those having destination addresses with scope=link-local are handled by software. Similarly, since IPv4 compatible or IPv4 mapped IPv6 addresses are not commonly used, and are expected to be eventually obsoleted, they can therefore be handled by software.

Figure 14:
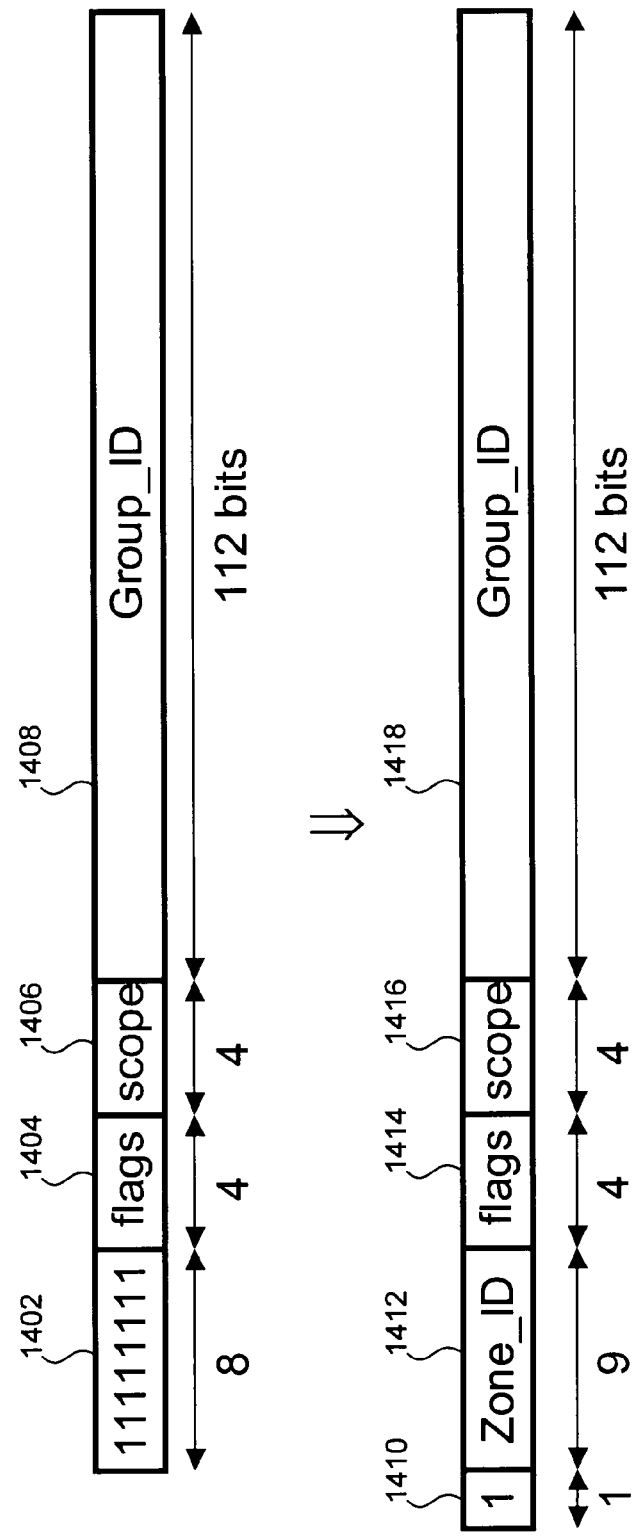
FIG. 14 is a diagram illustrating how to obtain a compacted representation (reduced in size without losing information) of an IPv6 multicast address in accordance with another embodiment of the invention.
Figure 15:
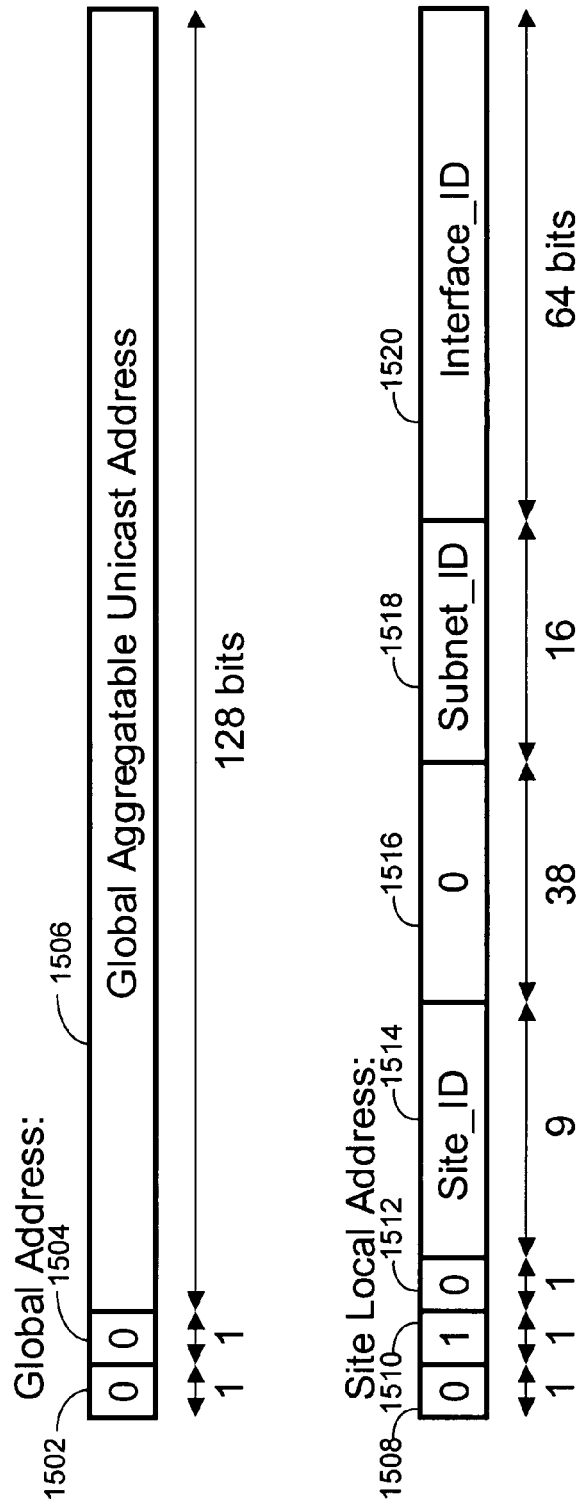
FIG. 15 is a diagram illustrating how to obtain a compacted representation (reduced in size without losing information) of various kinds of IPv6 unicast address in accordance with another embodiment of the invention.
Figure 16:
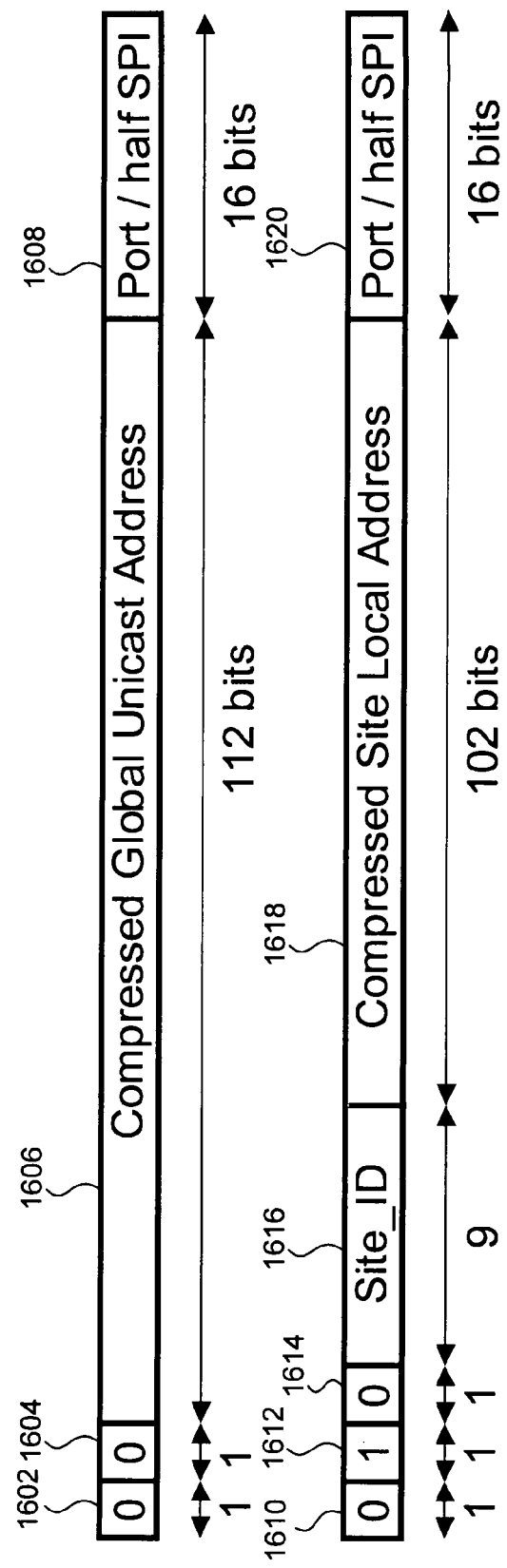
FIG. 16 is a diagram illustrating how to obtain a compressed representation (reduced in size by losing some information) of various kinds of IPv6 unicast address in accordance with another embodiment of the invention.

Assuming that the zone_ID is further reduced to 9 bits and the additional optimizations are implemented, the format of a compacted multicast address is illustrated in FIG. 14. Similarly, the format of a compacted unicast address is illustrated in FIG. 15 and the format of a compressed unicast address is illustrated in FIG. 16. The format of the four types of keys corresponding to the formats illustrated in FIGS. 14 through 16 are described below with reference to FIGS. 17 through 19. Specifically, the format of the first and third keys are illustrated in FIG. 17, the format of the second key is illustrated in FIG. 18, and the format of the fourth key is illustrated in FIG. 19.

As shown in FIG. 17, when the packet is a TCP/UDP, SCTP, or ESP packet, the access list key includes 276 bits, leaving 12 bits for TCAM management and other information. Specifically, as shown, the access list key includes a key bit, 129 bits for the compressed unicast source address (including the source port (or half SPI)), 1 bit for a TCP SYN flag, 129 bits for the compressed unicast destination address (including the destination port (or half SPI)), 8 bits for the final Next_Header which designates the protocol, and 8 bits to encode a specific range of L4 ports, in the case of a policy key, or to encode the QoS DSCP, in the case of a QoS key.

FIG. 18 illustrates the format of the access list key when the packet is an ICMP packet. As shown, the access list key includes 276 bits, leaving 12 bits for TCAM management and other information. Specifically, as shown, the access list key includes a key bit, 129 bits for the compacted unicast source address, 130 bits for the compacted destination address, 8 bits for the final Next_Header which designates the protocol, and 8 bits to encode the ICMP type, in the case of a policy key, or to encode the QoS DSCP, in the case of a QoS key.

FIG. 19 illustrates the format of the access list key for the default case. The access list key includes 276 bits, leaving 12 bits for TCAM management and other information. As shown, the access list key includes a key bit, 129 bits for the compacted unicast source address, 130 bits for the compacted destination address, 8 bits for the final Next_Header which designates the protocol, and 8 bits reserved, in the case of a policy key, or to encode the QoS DSCP, in the case of a QoS key. In the above described embodiments, the four types of exemplary keys may be implemented in three different key formats as illustrated in FIG. 11 through FIG. 13 for addresses that are compacted. Similarly, three additional key formats illustrated in FIG. 17 through FIG. 19 may be implemented for addresses that are compressed.

It is important to note that these formats are merely illustrative of the bit reduction process, and therefore alternative access list key formats may be generated through both compaction and compression.

FIG. 20 is a diagram illustrating a key selection algorithm in accordance with various embodiments of the invention. As shown, if the protocol is TCP, UDP, SCTP, or ESP and the IPv6 destination address is unicast, the first class of keys as shown in FIG. 11 (or FIG. 17) is selected. If the protocol is ICMP, the second class of keys for ICMP packets as shown in FIG. 12 (or FIG. 18) is selected. Otherwise, if a protocol is found, the third, default class of keys as illustrated in FIG. 13 (or FIG. 19) is selected. In any of these cases, hardware handles packet. Otherwise, the packet is handled by software.

In alternative embodiments the number of kinds of keys used may be reduced or enlarged. As one example, a system could use only two kinds of keys, one for handling TCP/UDP/SCTP and the other one for the default case; possibly more granular processing will be handled by the software.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although various operations are described as being performed by hardware or software, these operations are merely illustrative and therefore these operations may be performed in an alternate manner. More specifically, these operations may be performed by software, hardware, or any combination of hardware and software. Moreover, the present invention would apply regardless of the context and system in which it is implemented. Thus, broadly speaking, the present invention need not be performed using a TCAM or the formats described above, but may be used to support other systems, memories and access lists, as well as other access list key formats. In addition, although compression and compaction methods and formats are described above with respect to IPv6 packets, the present invention may be applied with respect to other subsequent (or previous) IP versions, or to other network protocols, which may require additional (or fewer) numbers of bits.

The above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
    obtaining an IP source address from the IP source address field of the packet;
    obtaining an IP destination address from the IP destination address field of the packet;
    generating a modified IP source address from the obtained IP source address such that the number of bits in the modified IP source address is less than the number of bits in the obtained IP source address, wherein generating the modified IP source address includes removing one or more bits from the obtained IP source address;
    generating a modified IP destination address from the obtained IP destination address such that the number of bits in the modified IP destination address is less than the number of bits in the obtained IP destination address, wherein generating the modified IP destination address includes removing one or more bits from the obtained IP destination address;
    composing the access list key from the modified IP source address and the modified IP destination address;
    identifying an entry in the access list using the access list key that has been composed; and
    routing the packet according to information in the entry in the access list.

2. The method as recited in claim 1, further comprising:
    classifying the packet prior to composing the access list key, thereby enabling the access list key to be composed according to an access list key format.

3. The method as recited in claim 2, wherein classifying the packet comprises:
    obtaining contents of a Next_Header field of the packet to determine the protocol of the packet, wherein the protocol determines the access list key format.

4. The method as recited in claim 1, further comprising:
    classifying the packet as being compatible with one of a first set of one or more protocols or a second set of one or more protocols;
    handling the packet in hardware when the packet is classified as being compatible with one of the first set of one or more protocols; and
    handling the packet in software when the packet is classified as being compatible with one of the second set of one or more protocols.

5. The method as recited in claim 4, wherein the packet is classified as being compatible with one of the second set of protocols when the packet is not classified as being compatible with one of the first set of protocols.

6. The method as recited in claim 1, wherein generating a modified IP destination address comprises removing the middle consecutive 16 bits of the Interface_ID portion of the obtained IP destination address when the IP destination address is a unicast address, wherein the middle consecutive 16 bits of the Interface_ID portion does not include the first or last bits of the Interface_ID portion.

7. The method as recited in claim 1, wherein generating a modified IP source address comprises removing the middle consecutive 16 bits of the Interface_ID portion of the obtained IP source address when the IP source address is a unicast address, wherein the middle consecutive 16 bits of the Interface_ID portion does not include the first or last bits of the Interface_ID portion.

8. The method as recited in claim 1, wherein generating a modified IP destination address comprises removing the first 16 bits of the obtained IP destination address and generating a modified IP source address comprises removing the first 16 bits of the obtained IP source address.

9. The method as recited in claim 8, wherein the obtained IP destination address is an IPv6 address that is IPv4 compatible or mapped and wherein the obtained IP source address is an IPv6 address that is IPv4 compatible or mapped.

10. The method as recited in claim 8, wherein the access list key includes a source port number and a destination port number.

11. The method as recited in claim 8, wherein the modified IP destination address includes a destination port number and the modified IP source address includes a source port number.

12. The method as recited in claim 8, wherein the access list key includes a SPI.

13. The method as recited in claim 8, wherein the modified IP destination address includes a first half of a SPI and the modified IP source address comprises a second half of the SPI, the first half and the second half of the SPI together being a SPI used in the ESP protocol.

14. The method as recited in claim 1, wherein generating a modified IP destination address comprises removing the middle consecutive 16 bits of the Interface_ID portion of the obtained IP destination address when the IP destination address is a unicast address and wherein generating a modified IP source address comprises removing the middle consecutive 16 bits of the Interface_ID portion of the obtained IP source address when the IP source address is a unicast address, wherein the middle consecutive 16 bits of the Interface_ID portion does not include the first or last bits of the Interface_ID portion.

15. The method as recited in claim 14, wherein the access list key includes a source port number and a destination port number.

16. The method as recited in claim 14, wherein the modified IP destination address includes a destination port number and the modified IP source address includes a source port number.

17. The method as recited in claim 14, wherein the access list key includes a SPI.

18. The method as recited in claim 14, wherein the modified IP destination address includes a first half of a SPI and the modified IP source address comprises a second half of the SPI, the first half and the second half of the SPI together being a SPI used in the ESP protocol.

19. The method as recited in claim 1, wherein the IP source address and the IP destination address are IPv6 addresses.

20. The method as recited in claim 1, wherein the access list key is a policy access list key for accessing a policy access list.

21. The method as recited in claim 1, wherein the access list key is a QoS access list key for accessing a quality of service access list.

22. The method as recited in claim 1, wherein the access list key consists of 276 bits.

23. The method as recited in claim 1, wherein the access list key consists of 278 bits.

24. The method as recited in claim 1, further comprising: accessing an access list using the access list key.

25. The method as recited in claim 1, further comprising: accessing a TCAM using the access list key.

26. The method as recited in claim 1, wherein the IP source address and the IP destination address are each 128 bits long.

27. The method as recited in claim 1, wherein the packet is an IPv6 packet, the IP source address is an IPv6 address and the IP destination address is an IPv6 address.

28. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:

obtaining an IP source address from the IP source address field of the packet;

obtaining an IP destination address from the IP destination address field of the packet;

generating a modified IP source address from the obtained IP source address such that the number of bits in the modified IP source address is less than the number of bits in the obtained IP source address, wherein generating the modified IP source address includes removing one or more bits from the obtained IP source address;

generating a modified IP destination address from the obtained IP destination address such that the number of bits in the modified IP destination address is less than the number of bits in the obtained IP destination address, wherein generating the modified IP destination address includes removing one or more bits from the obtained IP destination address;

composing the access list key from the modified IP source address and the modified IP destination address;

identifying an entry in the access list using the access list key that has been composed;

routing the packet according to information in the entry in the access list; and classifying the packet prior to composing the access list key, thereby enabling the access list key to be composed according to an access list key format;

wherein classifying the packet comprises:

determining whether the packet is compatible with one of a first set of protocols including TCP, UDP, and SCTP, a second set of protocols including ICMP, or a third set of protocols including ESP;

wherein composing the access list key is performed according to an access list key format, the access list key format being a first format when the packet is compatible with one of the first set of protocols or the third set of protocols, a second format when the packet is compatible with one of the second set of protocols, or a third format when the packet is not classified as being compatible with one of the first, second, or third set of protocols.

29. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:

obtaining an IP source address from the IP source address field of the packet;

obtaining an IP destination address from the IP destination address field of the packet;

generating a modified IP source address from the obtained IP source address such that the number of bits in the modified IP source address is less than the number of bits in the obtained IP source address;

generating a modified IP destination address from the obtained IP destination address such that the number of bits in the modified IP destination address is less than the number of bits in the obtained IP destination address;

composing the access list key from the modified IP source address and the modified IP destination address;

identifying an entry in the access list using the access list key that has been composed; and routing the packet according to information in the entry in the access list, wherein the modified IP destination address comprises a zone_ID.

30. The method as recited in claim 29, wherein the zone_ID replaces a multicast prefix of the obtained IP destination address when the IP destination address is a multicast address.

31. The method as recited in claim 29, wherein the zone_ID replaces a local use prefix of the obtained IP destination address when the IP destination address is a local use unicast address.

32. The method as recited in claim 29, wherein the zone_ID identifies a link local zone or a site local zone.

33. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
  obtaining an IP source address from the IP source address field of the packet;
  obtaining an IP destination address from the IP destination address field of the packet;
  generating a modified IP source address from the obtained IP source address such that the number of bits in the modified IP source address is less than the number of bits in the obtained IP source address;
  generating a modified IP destination address from the obtained IP destination address such that the number of bits in the modified IP destination address is less than the number of bits in the obtained IP destination address;
  composing the access list key from the modified IP source address and the modified IP destination address;
  identifying an entry in the access list using the access list key that has been composed; and
  routing the packet according to information in the entry in the access list, wherein the modified IP destination address includes a multicast-unicast bit that indicates whether the modified IP destination address is multicast or unicast.

34. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
  obtaining an IP source address from the IP source address field of the packet;
  obtaining an IP destination address from the IP destination address field of the packet;
  generating a modified IP source address from the obtained IP source address such that the number of bits in the modified IP source address is less than the number of bits in the obtained IP source address, wherein generating the modified IP source address includes removing one or more bits from the obtained IP source address;
  generating a modified IP destination address from the obtained IP destination address such that the number of bits in the modified IP destination address is less than the number of bits in the obtained IP destination address, wherein generating the modified IP destination address includes removing one or more bits from the obtained IP destination address;
  composing the access list key from the modified IP source address and the modified IP destination address;
  identifying an entry in the access list using the access list key that has been composed; and
  routing the packet according to information in the entry in the access list;
  wherein the modified IP source address and modified IP destination address each include two bits used to indicate whether the corresponding address is a link-local, site local, or global scoped address.

35. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
  obtaining an IP source address from the IP source address field of the packet:
  obtaining an IP destination address from the IP destination address field of the packet;
  generating a modified IP source address from the obtained IP source address such that the number of bits in the modified IP source address is less than the number of bits in the obtained IP source address, wherein generating the modified IP source address includes removing one or more bits from the obtained IP source address:
  generating a modified IP destination address from the obtained IP destination address such that the number of bits in the modified IP destination address is less than the number of bits in the obtained IP destination address, wherein generating the modified IP destination address includes removing one or more bits from the obtained IP destination address;
  composing the access list key from the modified IP source address and the modified IP destination address;
  identifying an entry in the access list using the access list key that has been composed; and
  routing the packet according to information in the entry in the access list;
  wherein the modified IP source address comprises a zone_ID.

36. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
  obtaining an IP source address from the IP source address field of the packet;
  obtaining an IP destination address from the IP destination address field of the packet;
  generating a modified IP source address from the obtained IP source address such that the number of bits in the modified IP source address is less than the number of bits in the obtained IP source address;
  generating a modified IP destination address from the obtained IP destination address such that the number of bits in the modified IP destination address is less than the number of bits in the obtained IP destination address;

composing the access list key from the modified IP source address and the modified IP destination address;
identifying an entry in the access list using the access list key that has been composed; and
routing the packet according to information in the entry in the access list, wherein the modified IP source address includes a zone_ID, wherein the zone_ID replaces a local use prefix of the obtained IP source address when the IP source address is a local use unicast address.

37. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
   obtaining an IP source address from the IP source address field of the packet;
   obtaining an IP destination address from the IP destination address field of the packet;
   generating a modified IP source address from the obtained IP source address such that the number of bits in the modified IP source address is less than the number of bits in the obtained IP source address;
   generating a modified IP destination address from the obtained IP destination address such that the number of bits in the modified IP destination address is less than the number of bits in the obtained IP destination address;
   composing the access list key from the modified IP source address and the modified IP destination address;
   identifying an entry in the access list using the access list key that has been composed; and
   routing the packet according to information in the entry in the access list, wherein the modified IP source address includes a zone_ID and wherein the zone_ID identifies a link local zone or a site local zone.

38. A method of composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
   obtaining an IP source address from the IP source address field of the packet;
   obtaining an IP destination address from the IP destination address field of the packet;
   generating a modified IP source address from the obtained IP source address such that the number of bits in the modified IP source address is less than the number of bits in the obtained IP source address;
   generating a modified IP destination address from the obtained IP destination address such that the number of bits in the modified IP destination address is less than the number of bits in the obtained IP destination address;
   composing the access list key from the modified IP source address and the modified IP destination address;
   identifying an entry in the access list using the access list key that has been composed; and
   routing the packet according to information in the entry in the access list, the access list key including a key bit indicating whether the access list key is a policy access list key or a QoS access list key.

39. A computer-readable medium storing thereon computer-readable instructions for composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
   instructions for obtaining an IP source address from the IP source address field of the packet;
   instructions for obtaining an IP destination address from the IP destination address field of the packet;
   instructions for generating a modified IP source address from the obtained IP source address such that the number of bits in the modified IP source address is less than the number of bits in the obtained IP source address, wherein generating the modified IP source address includes removing one or more bits from the obtained IP source address;
   instructions for generating a modified IP destination address from the obtained IP destination address such that the number of bits in the modified IP destination address is less than the number of bits in the obtained IP destination address, wherein generating the modified IP destination address includes removing one or more bits from the obtained IP destination address;
   instructions for composing the access list key from the modified IP source address and the modified IP destination address;
   instructions for identifying an entry in the access list using the access list key that has been composed; and
   instructions for routing the packet according to information in the entry in the access list.

40. An apparatus for composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:
   a processor; and
   a memory, at least one of the processor and the memory being adapted for:
   obtaining an IP source address from the IP source address field of the packet;
   obtaining an IP destination address from the IP destination address field of the packet;
   generating a modified IP source address from the obtained IP source address such that the number of bits in the modified IP source address is less than the number of bits in the obtained IP source address, wherein generating the modified IP source address includes removing one or more bits from the obtained IP source address;
   generating a modified IP destination address from the obtained IP destination address such that the number of bits in the modified IP destination address is less than the number of bits in the obtained IP destination address, wherein generating the modified IP destination address includes removing one or more bits from the obtained IP destination address;
   composing the access list key from the modified IP source address and the modified IP destination address;
   identifying an entry in the access list using the access list key that has been composed; and
   routing the packet according to information in the entry in the access list.

41. An apparatus for composing an access list key for accessing information associated with a packet from an access list, the packet having an IP source address field and an IP destination address field, the IP source address field including an IP source address and the IP destination address field including an IP destination address, the IP source address and the IP destination address each having a number of bits, comprising:

means for obtaining an IP source address from the IP source address field of the packet;

means for obtaining an IP destination address from the IP destination address field of the packet;

means for generating a modified IP source address from the obtained IP source address such that the number of bits in the modified IP source address is less than the number of bits in the obtained IP source address, wherein generating the modified IP source address includes removing one or more bits from the obtained IP source address;

means for generating a modified IP destination address from the obtained IP destination address such that the number of bits in the modified IP destination address is less than the number of bits in the obtained IP destination address, wherein generating the modified IP destination address includes removing one or more bits from the obtained IP destination address;

means for composing the access list key from the modified IP source address and the modified IP destination address;

identifying an entry in the access list using the access list key that has been composed; and routing the packet according to information in the entry in the access list.

\* \* \* \* \*